United States Patent
Ohashi et al.

(10) Patent No.: US 8,568,520 B2
(45) Date of Patent: Oct. 29, 2013

(54) $CO_2$ RECOVERY SYSTEM AND $CO_2$ ABSORPTION LIQUID

(75) Inventors: Yukio Ohashi, Yokohama (JP); Takashi Ogawa, Yokohama (JP); Susumu Yamanaka, Yokohama (JP); Katsuya Yamashita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 496 days.

(21) Appl. No.: 12/898,188

(22) Filed: Oct. 5, 2010

(65) Prior Publication Data

US 2011/0079151 A1    Apr. 7, 2011

(30) Foreign Application Priority Data

Oct. 7, 2009    (JP) .................................. 2009-233898

(51) Int. Cl.
*B01D 53/14*    (2006.01)

(52) U.S. Cl.
USPC ................. 96/234; 96/242; 252/60; 252/184; 423/228; 95/236

(58) Field of Classification Search
None
See application file for complete search history.

(56) References Cited

U.S. PATENT DOCUMENTS

| | | | |
|---|---|---|---|
| 4,112,050 | A | 9/1978 | Sartori et al. |
| 4,112,051 | A | 9/1978 | Sartori et al. |
| 4,112,052 | A | 9/1978 | Sartori et al. |
| 4,313,917 | A * | 2/1982 | Ohta .............................. 423/228 |
| 4,368,059 | A | 1/1983 | Doerges et al. |
| 5,618,506 | A | 4/1997 | Suzuki et al. |
| 6,036,931 | A | 3/2000 | Yoshida et al. |
| 6,423,282 | B1 | 7/2002 | Araki et al. |
| 6,500,397 | B1 * | 12/2002 | Yoshida et al. ................ 423/228 |
| 2008/0050296 | A1 * | 2/2008 | Tontiwachwuthikul et al. .............................. 423/228 |

FOREIGN PATENT DOCUMENTS

| | | |
|---|---|---|
| EP | 0 705 637 A1 | 4/1996 |
| EP | 0 879 631 A1 | 11/1998 |
| EP | 0 880 990 A1 | 12/1998 |
| EP | 0 880 991 A1 | 12/1998 |
| EP | 0 558 019 B2 | 12/2005 |
| GB | 2 052 555 A | 1/1981 |

(Continued)

OTHER PUBLICATIONS

Combined Search and Examination Report issued by the British Patent Office on Jan. 4, 2011, for British Patent Application No. GB1016938.1.
"Research Institute of Innovative Technology for the Earth", Achievement Report, No. 4, pp. 3-6, (2006).

(Continued)

*Primary Examiner* — Duane Smith
*Assistant Examiner* — Phillip Shao
(74) *Attorney, Agent, or Firm* — Finnegan, Henderson, Farabow, Garrett & Dunner, L.L.P.

(57) ABSTRACT

In an embodiment, a $CO_2$ recovery system has an absorber, a regenerator, and a circulation device. An absorption liquid has an aqueous solution of amine having an alcohol group, and dimethyl silicone oil in which a part of methyl groups is substituted by at least one type selected from an aminoalkyl group, a carboxyl group, and a hydroxyl-containing alkyl group. The absorber contacts a combustion exhaust gas of a fossil fuel and the absorption liquid to absorb $CO_2$, which is contained in the combustion exhaust gas, into the absorption liquid. The regenerator releases $CO_2$ by applying thermal energy to the $CO_2$-absorbed absorption liquid. A circulation device circulates the absorption liquid between the absorber and the regenerator.

8 Claims, 1 Drawing Sheet

(56) References Cited

FOREIGN PATENT DOCUMENTS

| | | |
|---|---|---|
| JP | 61-71819 | 4/1986 |
| JP | 5-301023 | 11/1993 |
| JP | 8-252430 | 10/1996 |

OTHER PUBLICATIONS

Chakraborty, et al., "$CO_2$ Absorption in Aqueous Solutions of Hindered Amines", Chemical Engineering Science, vol. 41, No. 4, pp. 997-1003, (1986).

* cited by examiner

US 8,568,520 B2

$CO_2$ RECOVERY SYSTEM AND $CO_2$ ABSORPTION LIQUID

CROSS REFERENCE TO RELATED APPLICATION

This application is based upon and claims the benefit of priority from Japanese Patent Application No. 2009-233898, filed on Oct. 7, 2009; the entire contents of which are incorporated herein by reference.

FIELD

Embodiments described herein relate generally to a $CO_2$ recovery system for recovering $CO_2$, which is contained in the combustion exhaust gas generated by burning a fossil fuel, by an absorption liquid, and also relates to a $CO_2$ absorption liquid.

BACKGROUND

In recent years, the greenhouse effect due to $CO_2$ is being pointed out as one of causes of the global warming phenomenon, and measures against it are urgently needed in view of the global environmental protection. Since a major $CO_2$ generating source is found in areas of human activity where the fossil fuel is burnt, there are growing demands for limitation of $CO_2$ emission. Accordingly, a method of recovering $CO_2$ by removing it from the combustion exhaust gas by contacting the combustion exhaust gas to an absorption liquid has been studied vigorously for a thermal power plant using a large amount of fossil fuel.

As an example of the $CO_2$ recovery system, there is a known $CO_2$ recovery system (Research Institute of Innovative Technology for the Earth, 2006 Achievement Report). In a $CO_2$ recovery system, the combustion exhaust gas containing $CO_2$ to be recovered is guided to an absorption tower through a combustion exhaust gas supply line. Counterflow contact occurs between an absorption liquid supplied through an absorption liquid supply line and the combustion exhaust gas in the absorption tower, and $CO_2$ contained in the combustion exhaust gas is absorbed for removal by the absorption liquid. The combustion exhaust gas from which $CO_2$ has been removed goes upward, and it is exhausted through a combustion exhaust gas discharge line.

The absorption liquid having absorbed $CO_2$ is sent to a heat exchanger via a discharge pump through an absorption liquid discharge line, heated therein and further guided to a regeneration tower 32. The absorption liquid guided to the regeneration tower is heated for regeneration by a regenerative heater such that $CO_2$ is released and separated. The absorption liquid regenerated by the regeneration tower is guided again to the absorption tower by a supply pump. In this case, the temperature of the absorption liquid is adjusted by the heat exchanger or an absorption liquid cooler which is disposed if necessary.

And, $CO_2$ separated from the absorption liquid within the regeneration tower is cooled together with steam, which is generated when the absorption liquid is heated by the regenerative heater, by a reflux condenser. Subsequently, $CO_2$ and condensed water are separated from each other by a separator, and $CO_2$ from which steam has been removed is guided to a $CO_2$ recovery process through a recovery line. The separated condensed water is returned to the regeneration tower by a reflux pump.

As the absorption liquid in the $CO_2$ recovery system described above, many aqueous solutions containing an amine are known. JP-A 61-71819 (KOKAI) describes an acid gas scrapping composition containing nonaqueous solvents such as a sterically hindered amine and sulfolane, and 2-amino-2-methyl-1-propanol and the like as a sterically hindered primary monoamino alcohol.

JP-A 5-301023 (KOKAI) describes a particular aqueous hindered amine solution having as a typical example a hindered amine selected from a group consisting of 2-amino-2-methyl-1-propanol, 2-(methylamino)-ethanol, 2-(ethylamino)-ethanol, 2-(diethylamino)-ethanol, and 2-(hydroxyethyl)-piperidine.

JP-A 8-252430 (KOKAI) describes an amine mixed solution which has secondary and tertiary amines each having a concentration in a range of 10-45 wt %. A $CO_2$ absorption behavior of an aqueous solution of 2-amino-2-2 methyl-1-propanol which is a hindered amine is disclosed in Chemical Engineering Science, Vol. 41, No. 4, pp. 997-1003.

In a case where the above absorption liquid is used, it is preferable that the absorption liquid is cooled to a given level and introduced into the absorption tower because the concentration of $CO_2$ in the absorption liquid becomes high when its temperature is lower. And, since the release of $CO_2$ is an endothermic reaction, the regeneration tower needs to heat the absorption liquid.

But, the release of $CO_2$ by the regeneration tower requires an enormous amount of thermal energy, which contributes to the high cost when $CO_2$ is recovered and becomes a major hurdle in view of practical realization of the $CO_2$ recovery system. In other words, when the absorption liquid is heated in order to release $CO_2$, 50 mass % or more of water generally contained in the absorption liquid is evaporated at the same time, and its evaporative latent heat is high. Therefore, about a half of the thermal energy supplied from the regenerative heater and the like is consumed for evaporating the water.

Meanwhile, the amine in the absorption liquid is hydrated with water molecules by a hydrophilic group, and OH groups present at this time play an important role in bonding with $CO_2$, and more specifically with $CO_3^{2-}$. Therefore, to provide the functions as the absorption liquid, it is necessary to have some water in the absorption liquid, and it is hard to eliminate water completely.

DETAILED DESCRIPTION

Figure 1:
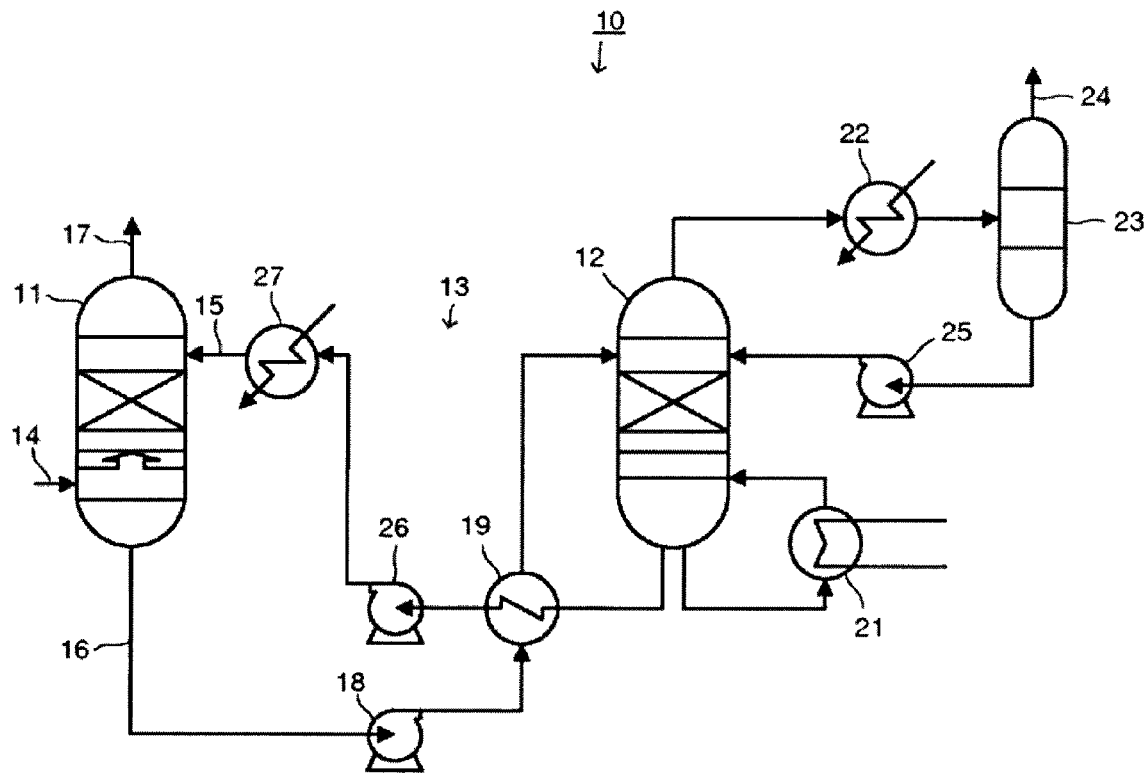
FIG. 1 is a schematic configuration view showing the $CO_2$ recovery system according to one embodiment.

According to one embodiment, the $CO_2$ recovery system has an absorber, a regenerator, and a circulation means. An absorption liquid consists of an aqueous solution of an amine having an alcohol group (alcoholic hydroxyl group), and dimethyl silicone oil in which a part of methyl groups is substituted (replaced) by at least one type selected from an aminoalkyl group, a carboxyl group and a hydroxyl-containing alkyl group. The absorber contacts a combustion exhaust gas of a fossil fuel and the absorption liquid to absorb $CO_2$ contained in the combustion exhaust gas into the absorption liquid. The regenerator applies thermal energy to the $CO_2$-absorbed absorption liquid to release $CO_2$. The circulation means circulates the absorption liquid between the absorber and the regenerator.

As described above, the aqueous solution of an amine having an alcohol group, which is a conventional absorption liquid, generally contains 50 mass % or more of water. And, when $CO_2$ is released from the absorption liquid by the regenerator, water is evaporated and evaporative latent heat is high, so that enormous thermal energy is required.

In this embodiment, as the absorption liquid in the above-described $CO_2$ recovery system, there is used one composed of the aqueous solution of an amine having an alcohol group and the above-described particular dimethyl silicone oil, namely one having water in a conventional absorption liquid partly substituted by the particular dimethyl silicone oil. As a result, the thermal energy needed for releasing $CO_2$ is decreased, and the cost for recovering $CO_2$, which hinders practical realization of the conventional $CO_2$ recovery system, is reduced. Thus, the use of the absorption liquid can contribute to practical realization of the $CO_2$ recovery system.

In other words, the dimethyl silicone oil generally has a vapor pressure and evaporative latent heat lower than those of water at the same temperature. Therefore, when it is used as part of water in the conventional absorption liquid, evaporation of the absorption liquid is reduced or evaporative latent heat is substantially reduced, and thermal energy needed for releasing $CO_2$ can be reduced while $CO_2$ is released effectively in the same manner as the conventional method. The dimethyl silicone oil is generally excellent in heat resistance, viscosity stability to temperatures and chemical stability. It is also noncorrosive and has a high flash point. Therefore, the dimethyl silicone oil can be suitably used as the absorption liquid in the $CO_2$ recovery system.

But, simple dimethyl silicone oil which is not modified does not have sufficient hydrophilicity and is not necessarily sufficient as it is to be used as a substitute for water in the conventional absorption liquid. Therefore, it is determined in this embodiment to use the above-described dimethyl silicone oil or so-called modified silicone oil, in which a part of methyl groups is substituted by at least one selected from the aminoalkyl group, the carboxyl group, and the hydroxyl-containing alkyl group.

Here, in an aqueous solution of an amine having an alcoholic hydroxyl group, $CO_2$ is chemically absorbed by the following reaction.

<Primary and Secondary Amines>

$Amine + CO_2 \rightarrow AmineCOO^- + H^+$ $Amine + H^+ \rightarrow AmineH^+$

When a primary amine or a secondary amine is used as the amine, $AmineCOO^-$ is attracted by $AmineH^+$ in the aqueous solution to chemically absorb $CO_2$ <Tertiary Amine>

$CO_2 + H_2O \rightarrow H^+ + HCO_3^-$ $Amine + H^+ \rightarrow AmineH^+$

When a tertiary amine is used as the amine, $HCO_3^-$ is attracted by $AmineH^+$ in the aqueous solution to chemically absorb $CO_2$.

In any event, the presence of water is required to cause the reaction, and it is preferable that the dimethyl silicone oil to be used together with water has hydrophilicity, namely a polarity. From the above viewpoint, it is preferable that the dimethyl silicone oil has the above-described carboxyl group or hydroxyl-containing alkyl group. And, it is preferable that the dimethyl silicone oil has an aminoalkyl group in view of improvement of the $CO_2$ absorption capability (capacity).

The dimethyl silicone oil used in this embodiment may be made of one type of dimethyl silicone oil only in which a part of methyl groups is substituted by an aminoalkyl group, a carboxyl group, or a hydroxyl-containing alkyl group. The dimethyl silicone oil used in this embodiment may be a mixture of two or more types of dimethyl silicone oils having a different substituent group. The dimethyl silicone oil used in this embodiment may also be dimethyl silicone oil in which a part of methyl groups is substituted by two or more types of substituent groups selected from an aminoalkyl group, a carboxyl group, and a hydroxyl-containing alkyl group.

Figure 2:
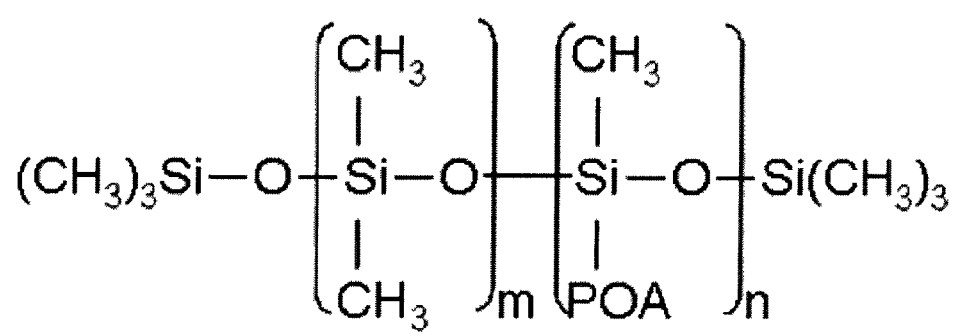
FIG. 2 is a figure showing an example of a chemical formula of dimethyl silicone oil.

FIG. 2 shows an example of a chemical formula of the dimethyl silicone oil. The symbols "m" and "n" are integers about 10 or less (corresponding to 1000 or less of the molecular weight of the dimethyl silicone oil). The POA (polyether group) is shown as the following (1) or (2).
(1) Polyethylene Oxide
(2) A random copolymer of Polyethylene oxide and Polypropylene oxide Meanwhile, as the aqueous solution of an amine having an alcohol group (alcoholic hydroxyl group) which composes a part of the absorption liquid, substantially the same one as the known absorption liquid can be used except that a water content is different, and an aqueous solution of an amine, which has a known amine having an alcohol group dissolved in water, can be used.

Examples of the amine include an amine (A) having an alcohol group and a primary amino group, an amine (B) having an alcohol group and a secondary amino group, an amine (C) having an alcohol group and a tertiary amino group, and piperidines (D). They may be used alone or in a combination of two or more types.

Examples of the amine (A) having an alcohol group and a primary amino group include 2-amino-2-methyl-1-propanol, 3-amino-3-methyl-2-pentanol, 2,3-dimethyl-3-amino-1-butanol, 2-amino-2-ethyl-1-butanol, 2-amino-2-methyl-3-pentanol, 2-amino-2-methyl-1-butanol, 3-amino-3-methyl-1-butanol, 3-amino-3-methyl-2-butanol, 2-amino-2,3-dimethyl-3-butanol, 2-amino-2,3-dimethyl-1-butanol, 2-amino-2-methyl-1-pentanol, monoethanolamin (MEA), and diglycolamine (DGA).

Examples of the amine (B) having an alcohol group and a secondary amino group include 2-(ethylamino)-ethanol, 2-(methylamino)ethanol, 2-(propylamino)-ethanol, 2-(isopropylamino)-ethanol, 1-(ethylamino)-ethanol, 1-(methylamino)ethanol, 1-(propylamino)-ethanol, 1-(isopropylamino)-ethanol, 2-dimethylamine (DMA), and diisopropanolamine (DIPA).

Examples of the amine (C) having an alcohol group and a tertiary amino group include 2-(dimethylamino)-ethanol, 2-(diethylamino)-ethanol, 2-(ethylmethylamino)-ethanol, 1-(dimethylamino)-ethanol, 1-(diethylamino)-ethanol, 1-(ethylmethylamino)-ethanol, 2-(diisopropylamino)-ethanolethanol, 1-(diethylamino)-2-propanol, 3-(diethylamino)-1-propanol, and methyldiethanolamine (MDEA).

Examples of the piperidines (D) include 2-(hydroxymethyl)-piperidine, 2-(2-hydroxyethyl)-piperidine, 2-(1-hydroxymethyl)-piperidine, and piperazine (PZ).

The amount of dimethyl silicone oil in the absorption liquid is not necessarily restricted, but if its amount is excessively large, there is a possibility that the chemical absorption of $CO_2$ is inhibited. Therefore, the amount of dimethyl silicone oil contained in the absorption liquid is preferably determined to be 50 mass % or less to the total amount of water and dimethyl silicone oil. And, when the amount of dimethyl silicone oil contained in the absorption liquid is excessively small, the effect of reducing the thermal energy is small. Therefore, it is determined to be 10 mass % or more, and preferably 30 mass % or more and 50 mass % or less with respect to the total amount of water and dimethyl silicone oil.

The absorption liquid of this embodiment contains at least an aqueous solution of an amine having an alcohol group (alcoholic hydroxyl group), and dimethyl silicone oil in which apart of methyl groups is substituted by at least one type selected from an aminoalkyl group, a carboxyl group, and a hydroxyl-containing alkyl group. But, a corrosion inhibitor, an amine deterioration inhibitor and the like may be contained without departing from the scope of this embodiment or if necessary.

The $CO_2$ recovery system using the absorption liquid consisting of the aqueous solution of amine having the alcohol group and the particular dimethyl silicone oil described above is specifically described below. FIG. 2 is a schematic configuration view showing an example of a $CO_2$ recovery system 10 according to this embodiment.

The $CO_2$ recovery system 10 has an absorption tower 11 which is an absorber for absorbing $CO_2$ contained in the combustion exhaust gas into an absorption liquid (absorption liquid consisting of an aqueous solution of amine having an alcohol group and particular dimethyl silicone oil), a regeneration tower 12 which is a regenerator for releasing $CO_2$ by applying thermal energy to the $CO_2$-absorbed absorption liquid, and a circulation line 13 which is a circulation means for circulating the absorption liquid between the absorption tower 11 and the regeneration tower 12.

The absorption tower 11 is connected with a combustion exhaust gas supply line 14 for supplying a combustion exhaust gas containing $CO_2$ to be recovered, and an absorption liquid supply line 15 for supplying the absorption liquid for absorbing $CO_2$ contained in the combustion exhaust gas. The absorption tower 11 is also connected with an absorption liquid discharge line 16 for discharging the $CO_2$-absorbed absorption liquid, and a combustion exhaust gas discharge line 17 for discharging the combustion exhaust gas from which $CO_2$ has been removed. The absorption liquid discharge line 16 is connected to the regeneration tower 12 via a discharge pump 18 and a heat exchanger 19.

The regeneration tower 12 is connected with a regenerative heater 21 for regenerating the absorption liquid by heating. The regeneration tower 12 is also connected with a separator 23 for separating, as condensed water, steam from the $CO_2$ which is separated together with steam from the absorption liquid via a reflux condenser 22. The separator 23 is connected with a recovery line 24 for recovering the $CO_2$ from which steam has been separated and a reflux pump 25 which returns the condensed water to the regeneration tower 12.

The regeneration tower 12 is also connected with the absorption liquid supply line 15 for supplying the absorption tower 11 with the absorption liquid which has been regenerated by releasing $CO_2$. The absorption liquid supply line 15 is connected with the absorption tower 11 via a supply pump 26 and an absorption liquid cooler 27 in addition to the above-described heat exchanger 19. Here, the absorption liquid supply line 15 and the absorption liquid discharge line 16 connect the absorption tower 11 and the regeneration tower 12 into a substantially circular form, thereby forming the circulation line 13 for circulating the absorption liquid between them.

In the above $CO_2$ recovery system 10, the combustion exhaust gas containing $CO_2$ to be recovered is guided to the absorption tower 11 through the combustion exhaust gas supply line 14 to come into counterflow contact with the absorption liquid supplied through the absorption liquid supply line 15. Thus, the $CO_2$ contained in the combustion exhaust gas is absorbed for removal by the absorption liquid, and the $CO_2$-removed combustion exhaust gas goes upward and is exhausted through the combustion exhaust gas discharge line 17. And, the $CO_2$-absorbed absorption liquid is exhausted through the absorption liquid discharge line 16.

The absorption liquid exhausted from the absorption tower 11 is guided to the heat exchanger 19 by the discharge pump 18, heated by the heat exchanger 19 and introduced into the regeneration tower 12. The absorption liquid introduced into the regeneration tower 12 is heated by the regenerative heater 21 and returned to the regeneration tower 12. Thus, heating causes to release and separate $CO_2$ from the absorption liquid. The separated $CO_2$ is contacted to and cooled by reflux water inside the reflux condenser 22, and the accompanying steam is separated as condensed water by the separator 23. The condensed water-separated $CO_2$ is guided to a $CO_2$ recovery process through the recovery line 24. And, the condensed water is returned to the regeneration tower 12 by the reflux pump 25.

Meanwhile, the absorption liquid regenerated by the regeneration tower 12 is introduced into the absorption tower 11 by the supply pump 26 through the absorption liquid supply line 15. At this time, in the heat exchanger 19, the regenerated absorption liquid heats the absorption liquid to be introduced into the regeneration tower 12 while it is cooled at the same time. The absorption liquid to be introduced into the absorption tower 11 is also adjusted its temperature by the absorption liquid cooler 27 disposed at the middle of the absorption liquid supply line 15 in addition to the heat exchanger 19.

In the $CO_2$ recovery system 10, the absorption liquid used comprises an aqueous solution of amine having the alcohol group and the particular dimethyl silicone oil. As a result, thermal energy can be used effectively to release the original target $CO_2$, and the needed thermal energy can be reduced in comparison with a case that the conventional absorption liquid is used. Thus, the cost of $CO_2$ recovery can be reduced to contribute to practical realization of the $CO_2$ recovery system.

The individual component parts of the $CO_2$ recovery system according to this embodiment can be modified appropriately when $CO_2$ can be absorbed and released by circulating the particular absorption liquid between the absorber and the regenerator.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A $CO_2$ recovery system, comprising:
   an absorber for absorbing $CO_2$ contained in a combustion exhaust gas of a fossil fuel into an absorption liquid by contacting the combustion exhaust gas and the absorption liquid;
   a regenerator for releasing $CO_2$ by applying thermal energy to the $CO_2$-absorbed absorption liquid; and
   a circulation device for circulating the absorption liquid between the absorber and the regenerator,
   wherein the absorption liquid has an aqueous solution of amine having an alcohol group and dimethyl silicone oil in which a part of a plurality of methyl groups is substituted by at least one type selected from an aminoalkyl group, a carboxyl group and a hydroxyl-containing alkyl group, wherein a ratio of the dimethyl silicone oil to a total amount of water and the dimethyl silicone oil in the absorption liquid is from 10 mass % to 50 mass %.

2. The $CO_2$ recovery system according to claim 1, wherein the absorption liquid has:

first dimethyl silicone oil in which a part of methyl groups is substituted by a first substituent group selected from an aminoalkyl group, a carboxyl group, and a hydroxyl-containing alkyl group, and second dimethyl silicone oil in which a part of methyl groups is substituted by a second substituent group selected from an aminoalkyl group, a carboxyl group and a hydroxyl-containing alkyl group and different from the first substituent group.

3. The $CO_2$ recovery system according to claim 1, wherein the dimethyl silicone oil is dimethyl silicone oil in which a part of methyl groups is substituted by two or more types of substituent groups selected from an aminoalkyl group, a carboxyl group, and a hydroxyl-containing alkyl group.

4. The $CO_2$ recovery system according to claim 1, wherein the amine is selected from an amine (A) having an alcohol group and a primary amino group, an amine (B) having an alcohol group and a secondary amino group, an amine (C) having an alcohol group and a tertiary amino group, and piperidines (D).

5. A $CO_2$ absorption liquid comprising:

an aqueous solution of amine having an alcohol group; and dimethyl silicone oil in which a part of a plurality of methyl groups is substituted by at least one type selected from an aminoalkyl group, a carboxyl group, and a hydroxyl-containing alkyl group, wherein a ratio of the dimethyl silicone oil to a total amount of water and the dimethyl silicone oil in the absorption liquid is from 10 mass % to 50 mass %.

6. The $CO_2$ absorption liquid according to claim 5, wherein the absorption liquid has:

first dimethyl silicone oil in which a part of methyl groups is substituted by a first substituent group selected from an aminoalkyl group, a carboxyl group, and a hydroxyl-containing alkyl group, and second dimethyl silicone oil in which a part of methyl groups is substituted by a second substituent group selected from an aminoalkyl group, a carboxyl group and a hydroxyl-containing alkyl group and different from the first substituent group.

7. The $CO_2$ absorption liquid according to claim 5, wherein the dimethyl silicone oil is dimethyl silicone oil in which a part of methyl groups is substituted by two or more types of substituent groups selected from an aminoalkyl group, a carboxyl group, and a hydroxyl-containing alkyl group.

8. The $CO_2$ absorption liquid according to claim 5, wherein the amine is selected from an amine (A) having an alcohol group and a primary amino group, an amine (B) having an alcohol group and a secondary amino group, an amine (C) having an alcohol group and a tertiary amino group, and piperidines (D).

* * * * *